(No Model.)
M. HALFPENNY.
TWO WHEELED VEHICLE.
No. 277,482. Patented May 15, 1883.
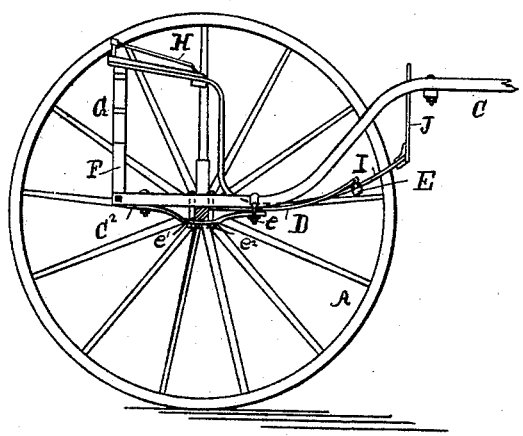
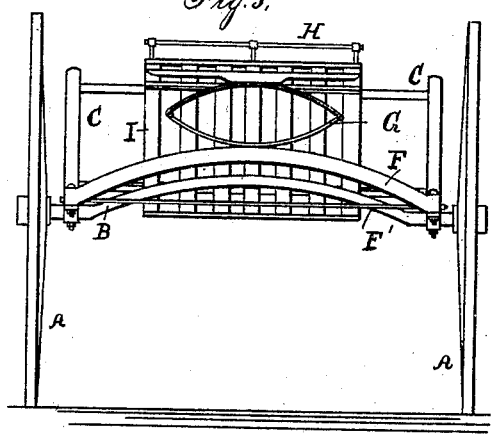
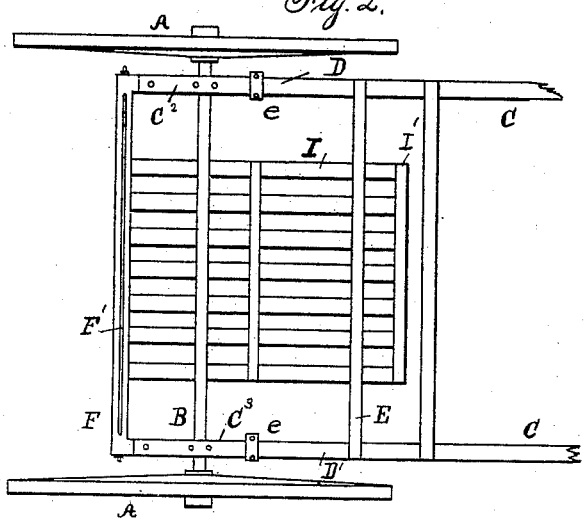
WITNESSES
N. S. Wright.
A. E. Inglis.
INVENTOR
Martin Halfpenny
By W. W. Legg
Attorney

UNITED STATES PATENT OFFICE.

MARTIN HALFPENNY, OF PONTIAC, MICHIGAN.

TWO-WHEELED VEHICLE.

SPECIFICATION forming part of Letters Patent No. 277,482, dated May 15, 1883.

Application filed February 2, 1883. (No model.)

*To all whom it may concern:*

Be it known that I, MARTIN HALFPENNY, of Pontiac, county of Oakland, State of Michigan, have invented a new and useful Improvement in Carts; and I declare the following to be a full, clear, and exact description of the same, such as will enable others skilled in the art to which it pertains to make and use it, reference being had to the accompanying drawings, which form a part of this specification.

My invention consists in the combination of devices and appliances hereinafter specified, and more particularly pointed out in the claims.

In the drawings, Figure 1 is a side elevation of a cart embodying my invention, with one of the wheels removed. Fig. 2 is an inverted plan view. Fig. 3 is a rear elevation.

My invention relates to that class of carts in common use for light driving-vehicles, and is designed, first, to cheapen their construction; second, to increase their elasticity; third, to so construct them that it shall be more convenient for a driver to mount to the seat.

In carrying out my invention I accomplish these objects as follows:

A represents the wheels; B, the axle.

C represents the shafts. I design to construct these shafts by bending them farther forward than is ordinarily the case, as shown in the drawings, the rear portion of the shafts secured to the axle extending suitably beyond it. By bending the shafts well forward, as shown, it is evident that the driver may mount to his seat with far greater facility than where the bend is farther to the rear, as is the case in other vehicles of this description.

D and D' represent any suitable springs, preferably a strap of spring-steel clipped to the shaft, as shown at $c$, the forward ends of the springs D and D' clipped or otherwise suitably secured to a cross-bar, E. I prefer to extend the forward ends of these springs a little to the front of the upward bend of the shafts. The shafts are secured to the axle in any proper manner—as, for instance, by means of metallic straps $C^2$ and $C^3$, bolted to the rear of the shafts and passing underneath the axle and secured to the shafts in front of the axle by means of the clips $e$.

$e'$ and $e^2$ represent bolts securing the straps $C^2$ and $C^3$ to the shafts on each side of the axle.

F is a rear cross-bar, preferably curved upward in the center, and supporting an elliptical spring.

F' is a brace uniting the rear ends of the shafts.

I design to construct the body of the cart of suitable strips, I, bent as shown in the drawings, said strips forming the floor of the body, and extending upward in front of the forward edge of the seat H, thence rearward, forming the bottom of the seat, said seat secured upon the elliptical spring G at the rear. These strips are secured in front to a suitable beam, I'. J is the dash-board, secured to said beam.

It is evident that by constructing the body of the cart of continuous strips or slats bent into the required form, the expense of its construction is reduced to a minimum, while the springs beneath the seat and beneath the shafts give to the device great elasticity, thus making it a more easy riding vehicle.

What I claim is—

1. A driving-cart combining in its structure the following elements, to wit: a wheeled axle, shafts having straight portions secured to the axle and bent upward and forward to render the seat easily accessible, springs having their rear ends secured to the under sides of the straight portions of the shafts in front of the axle, a rear cross-bar uniting rearward extensions of the shafts, an elliptical spring secured to said rear cross-bar, and a body composed of bent strips having at their rear ends a seat and at their front ends a dash-board, substantially as and for the purposes described.

2. In a driving-cart, the combination of the wheeled axle B, the shafts C, extending straight from the axle and then bent upward and forward, the springs D D', having their rear ends secured to the straight portions of the shafts, and their forward ends connected by the front cross-bar, E, a body composed of strips resting at their forward portions on the front cross-bar, and bent upward and rearward to receive a seat and a support for said rear ends of the strips, substantially as described.

3. In a driving-cart, the combination of the wheeled axle B, the shafts extending in rear of the axle, and straight in front thereof, and then bent upward and forward, a rear cross-bar, F, connecting the rearward extensions of the shafts, a spring supported by said cross-bar, to which the seat H is secured, the springs D D', having their rear ends secured to the straight portions of the shafts, and their forward ends connected by a front cross-bar, E, a body composed of strips I, supported at their forward portions by the front cross-bar, and united by a beam, I', and a dash-board, J, attached to said beam, substantially as described.

In testimony whereof I sign this specification in the presence of two witnesses.

MARTIN HALFPENNY.

Witnesses:
 N. S. WRIGHT,
 A. E. INGLIS.